US011353343B2

(12) United States Patent
Cachro et al.

(10) Patent No.: US 11,353,343 B2
(45) Date of Patent: Jun. 7, 2022

(54) DETECTION OF COUPLING SLIPPAGE IN ROTARY ENCODER SYSTEMS

(71) Applicants: Dynapar Corporation, Gurnee, IL (US); Hengstler GmbH, Aldingen (DE)

(72) Inventors: Robert Cachro, Lake Zurich, IL (US); Mišél Batmend, Stará Ľubovňa (SK); John Reading, Frisco, TX (US); Ryan Kirkendall, Wilmington, NC (US); Michael Parks, St. John, IN (US); Sarah Lauterbach, Scottsdale, AZ (US); Eduard Ribar, Batizovce (SK)

(73) Assignees: DYNAPAR CORPORATION, Gurnee, IL (US); HENGSTLER GMBH, Aldingen (DE)

( * ) Notice: Subject to any disclaimer, the term of this patent is extended or adjusted under 35 U.S.C. 154(b) by 0 days.

(21) Appl. No.: 17/454,087

(22) Filed: Nov. 9, 2021

(65) Prior Publication Data
US 2022/0146288 A1 May 12, 2022

Related U.S. Application Data

(60) Provisional application No. 63/198,733, filed on Nov. 9, 2020.

(51) Int. Cl.
*G01D 5/34* (2006.01)
*G01D 5/347* (2006.01)

(52) U.S. Cl.
CPC ................. *G01D 5/3473* (2013.01)

(58) Field of Classification Search
CPC .. G01D 5/3473; G01D 5/34738; B41J 19/207
See application file for complete search history.

(56) References Cited

U.S. PATENT DOCUMENTS

| 4,305,674 A | * | 12/1981 | Velazquez | B41J 19/202 400/323 |
| 8,285,430 B2 | * | 10/2012 | Yabuuchi | B60L 3/10 701/19 |
| 8,459,117 B2 | | 6/2013 | Gustafsson | |
| 2019/0001953 A1 | | 1/2019 | Nada | |

FOREIGN PATENT DOCUMENTS

DE 2602619 A1 7/1977

OTHER PUBLICATIONS

Written Opinion of the International Searching Authority for International Application No. PCT/IB2021/060366, dated Feb. 16, 2022, 5 pages.

* cited by examiner

*Primary Examiner* — Kevin K Pyo
(74) *Attorney, Agent, or Firm* — Moreno IP Law LLC

(57) ABSTRACT

Detection of mechanical coupling slippage in rotary encoder systems is provided where position data samples are obtained from a rotary encoder coupled to rotating element and angular acceleration data is determined based on the position data samples. At least two acceleration peaks are detected in the angular acceleration data, including at least one negative acceleration peak and at least one positive acceleration peak. Slippage occurrence of the mechanical coupling are detected when an interval between a negative acceleration peak and a positive acceleration peak of the at least two acceleration peaks is less than a first time period. If at least a threshold number of slippage occurrences are detected within a second time period, a mechanical coupling error signal is generated.

17 Claims, 4 Drawing Sheets

DETECTION OF COUPLING SLIPPAGE IN ROTARY ENCODER SYSTEMS

FIELD

The present disclosure concerns rotary encoder systems and, in particular, the detection of mechanical coupling slippage in such systems.

BACKGROUND

Rotation detection sensors or rotary encoders (collectively referred to herein as "encoders") are common sensor devices. Many encoders use a combination of a bearing system and optical sensor elements to measure the rotation of a rotating member, e.g., an axle, shaft, wheel, etc. Data provided by an encoder is typically obtained via a cable operatively connecting the encoder and an appropriate controller. Controllers, as known in the art, typically include processing capability and are configured to incorporate data received from an encoder for use in operational control of one or more pieces of equipment that include, or are associated with, the rotating member being monitored by the encoder. Encoder systems incorporating such encoders may encompass a wide variety of equipment such as motors, generators, pumps, vehicles, etc.

Problems with the installation of such encoders in encoder systems often result from improper mechanical coupling of the encoder to the equipment being monitored. For example, in such systems, a mechanical coupling is often used to attach the rotating member of the equipment being monitored (the driving shaft) to an input shaft or similar mechanism of the rotary encoder (the driven shaft). As used herein, such couplings are mechanical elements used to make connections between two shafts to transfer power or motion from one shaft to another, and may encompass elements used to make permanent/semi-permanent connections (as in the case of sleeve couplings, split-muff couplings, flanged couplings, etc.) or rapid connections/disconnections (as in the case of clutch-type couplings, for example). As further known in the art, such mechanical couplings can deteriorate over time, sometimes resulting in slippage of either the driving or driven shaft within the coupling. Such slippage, if not detected in a timely manner, can result in control system failure and possibly equipment damage.

Thus, techniques for detecting such mechanical coupling slippage in encoder system would represent a welcome advancement of the art.

SUMMARY

The instant disclosure describes various techniques concerning the detection of mechanical coupling slippage in rotary encoder systems. In one embodiment, position data samples are obtained from a rotary encoder coupled to rotating element and angular acceleration data is determined based on the position data samples. At least two acceleration peaks are detected in the angular acceleration data, including at least one negative acceleration peak and at least one positive acceleration peak. Slippage occurrence of the mechanical coupling are detected when an interval between a negative acceleration peak and a positive acceleration peak of the at least two acceleration peaks is less than a first time period. If at least a threshold number of slippage occurrences are detected within a second time period, a mechanical coupling error signal is generated.

In another embodiment, the angular acceleration data is determined by first determining angular velocity data based on the position data samples. The angular velocity data is the filtered to provide filtered angular velocity data that is, in turn, subjected to derivative determinations to provide the angular acceleration data. In yet another embodiment, acceleration peaks are determined by identifying local most negative and most positive angular acceleration data points in the angular acceleration data, where the local most positive angular acceleration data point occurs after the local most negative angular acceleration data point. The local most negative and most positive angular acceleration data points are identified as acceleration peaks when a difference between the local most negative and most positive angular acceleration data points is greater than a difference threshold.

An apparatus in accordance with the above-described techniques is also disclosed.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

Figure 1:
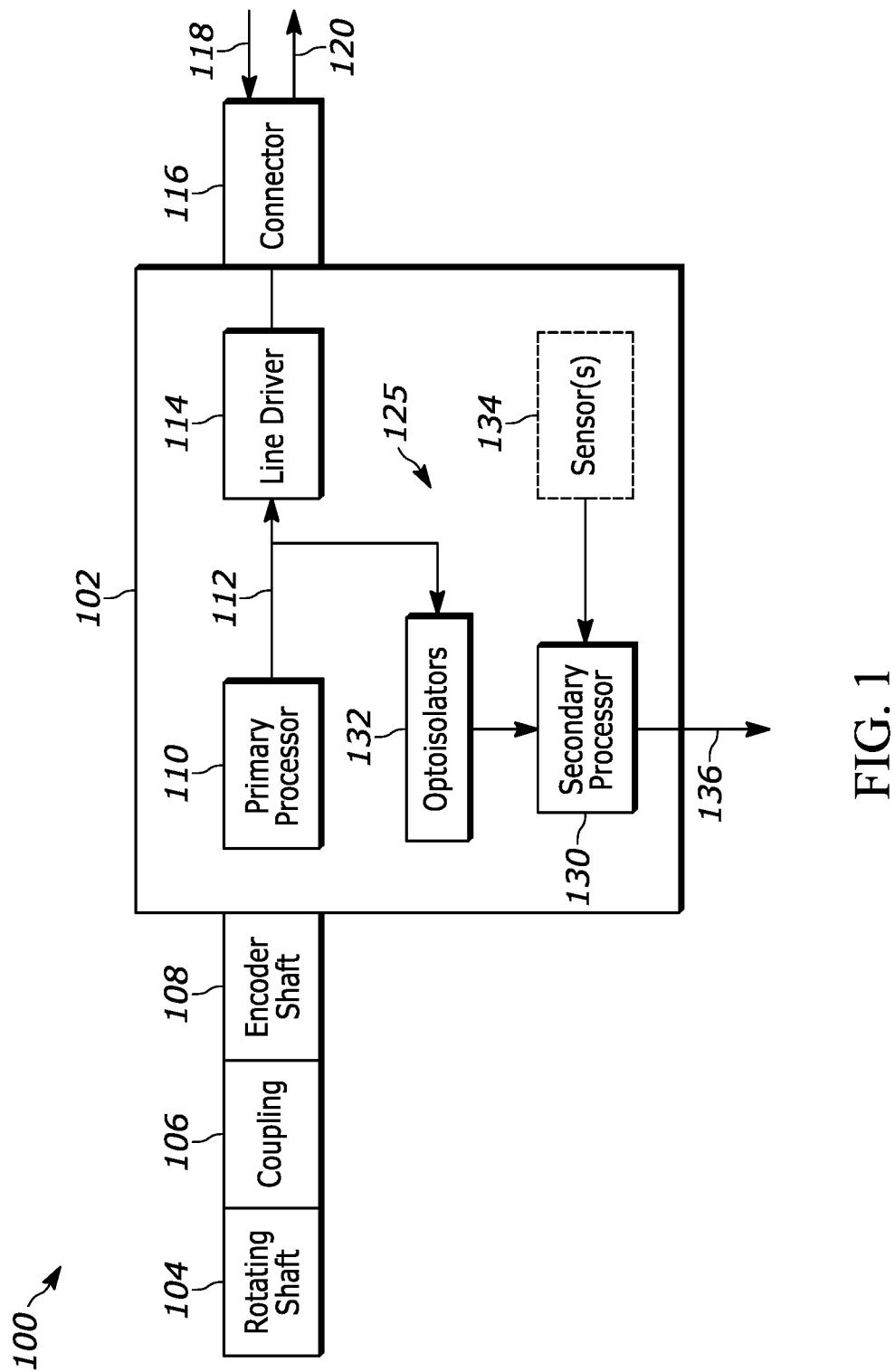
FIG. 1 is a schematic illustration of structural elements of an encoder system providing detection of mechanical coupling slippage relative to a rotating member and a rotary encoder in accordance with the instant disclosure.

Referring now to FIG. 1, a very schematically illustrated encoder system 100 in accordance with the instant disclosure is shown. As shown, the encoder system 100 includes a rotary encoder 102 comprising an encoder shaft 108 (or may be coupled to a device having such a shaft). Using known techniques, rotation of the encoder shaft 108 is monitored by appropriate hardware components (e.g., optical encoder disc, not shown) providing electrical signals to a primary processor 110 that continuously determines angular position data 112 (e.g., incremental A, B, Z, etc. signals as known in the art) for the encoder shaft 108, which position data 112 is provided, in turn, to a suitable line driver 114. The line driver 114 conditions the position data 112 for transmission 120, through a suitable connector 116, to a cable (not shown) electrically coupled thereto. As further known in the art, power 118 for the encoder 102 is often provided as an input to the encoder 102 via the cable and connector 116.

FIG. 1 also illustrates the encoder shaft 108 of the encoder 102 operatively connected to a rotating shaft (or member) 104 of the asset being monitored via a mechanical coupling 106 of the type described above.

In furtherance of detecting coupling slippage, the encoder 102 in the illustrated embodiment is further equipped with a sensing subsystem 125 comprising a secondary processor 130 and electrical isolation circuitry 132. As shown, the position data 112 is provided to the secondary processor 130 via the electrical isolation circuitry 132 that may comprise, in a presently preferred embodiment, one or more optical isolators as known in the art. In an embodiment, the sensing subsystem 125 may optionally include one or more sensors 134 configured to provide sensor output data to the secondary processor 130. Such sensors 134 may comprise any sensors useful for determining the physical conditions of the encoder 102, rotating member 104, coupling 106 and/or their surrounding environment. For example, the sensors 134 may include, but are not necessarily limited to, vibration or acceleration sensors, temperature sensors, etc.

As used herein, the term "processor" includes any devices capable of performing calculations or other data processing operations on signals provided thereto and to output further signals based on such calculations/data processing operations. Preferably, the calculations/processing performed by such processors (specifically, the processing described below relative to FIGS. 2-4) is performed in real-time. As used herein, real-time means fast enough to determine, as described below, slippage occurrences on the order of milliseconds or fractions of a second, and to determine mechanical error signals on the order of a few seconds up to tens of seconds. The primary and secondary processors 110, 130 may comprise, for example, microprocessors, microcontrollers, digital signal processors or other similar devices that carry out processing based on executable instructions stored suitable storage devices (read-only memory (RAM), read-only memory (ROM), volatile or non-volatile storage devices, etc.). For example, in the case of a general purpose microprocessor or digital signal processor, such instructions may be stored in separate storage devices operatively connected to such processors. Alternatively, in the case of a microcontroller or similar devices, such storage may be "on-chip" and thus avoid the need for separate storage device circuitry. As a further alternative, a processor in the context of the instant disclosure may comprise hardware or firmware devices such as application specific integrated circuits (ASICs), programmable logic arrays (PLAs) or similar devices as known in the art.

Additionally, though the system of FIG. 1 illustrates the primary and secondary processors 110, 130 as being deployed as part of the encoder 102, it is appreciated that this is not a requirement. For example, the secondary processor 130 need not be resident in the encoder 102 and may instead be provided remotely relative to the encoder 102, or even the system 100. In this case, the encoder 102 may be configured with further components for providing the position data 112 (and, if available, any sensor 134 outputs) to the remotely deployed secondary processor 130.

As described in further detail below, the secondary processor 130 is configured to analyze the position data 112 to identify instances of coupling slippage. Based on such analysis, the secondary processor 130 provides a mechanical coupling error signal or alert 136. For example, in one embodiment, alert 136 can be provided by the secondary processor 130 via a suitable communication channel (using, e.g., a suitable wired/wireless communication protocols such as high/low digital output, 4-20 mA or 0-10V analog output, IO-Link, TCP/IP, Bluetooth, etc.). In another embodiment, though not preferred, the alert 136 may be provided to the line driver 114 (potentially via the electrical isolation circuitry 132) such that the alert 136 is superimposed onto existing electrical conductors in the connector 116 for output.

In a presently preferred embodiment, the alert 136 may comprise one or more fault codes, where each fault code is indicative of a particular failure mode detected by the secondary processor 130. Thus, for example, if the secondary processor 130 is capable of detecting six different failure modes, six corresponding and unique fault codes could be defined for output by the secondary processor 130. Alternatively, or additionally, the alert 136 may include data representative of the various sensor 134 inputs to the secondary processor 130 (e.g., vibration or speed measurement data) or results based on processing performed by secondary processor 130 on the sensor 134 inputs (e.g., fast Fourier transform (FFT) results, acceleration calculations, etc.).

Figure 2:
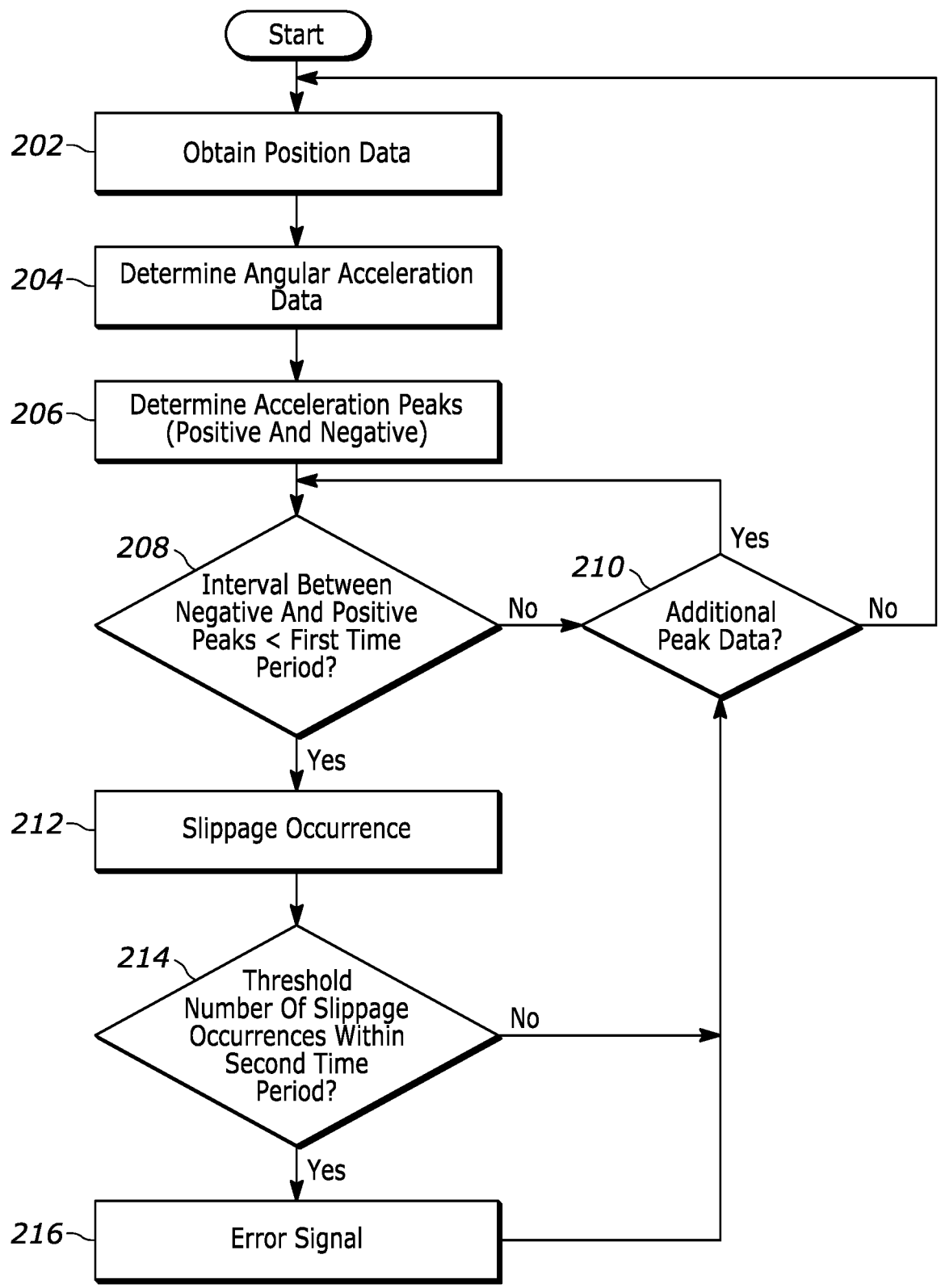
FIG. 2 is a flow chart illustrating processing in accordance with the instant disclosure.
Figure 3:
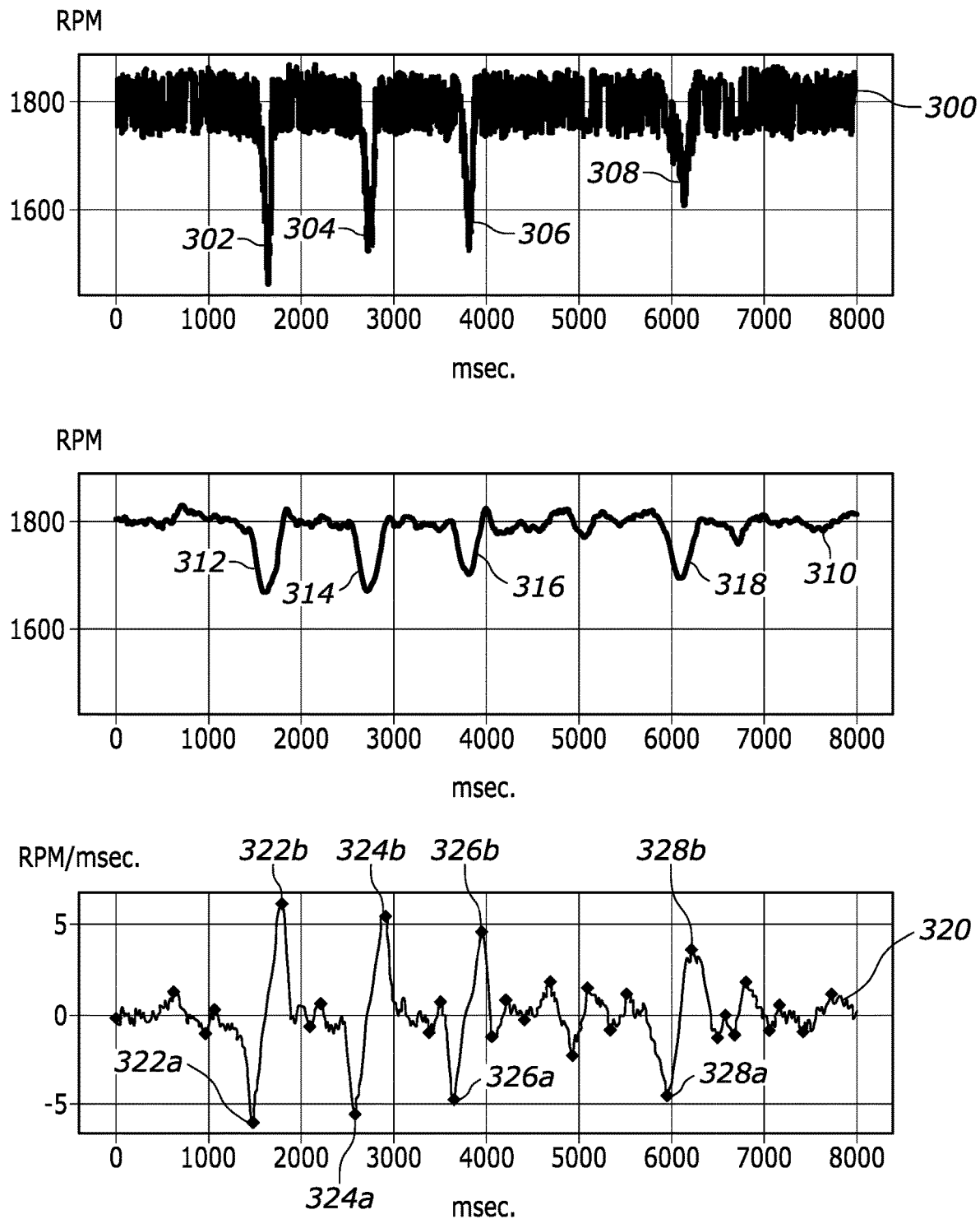
FIG. 3 are graphs illustrating the detection of acceleration peaks based on position data samples obtained from a rotary encoder in accordance with the instant disclosure.
Figure 4:
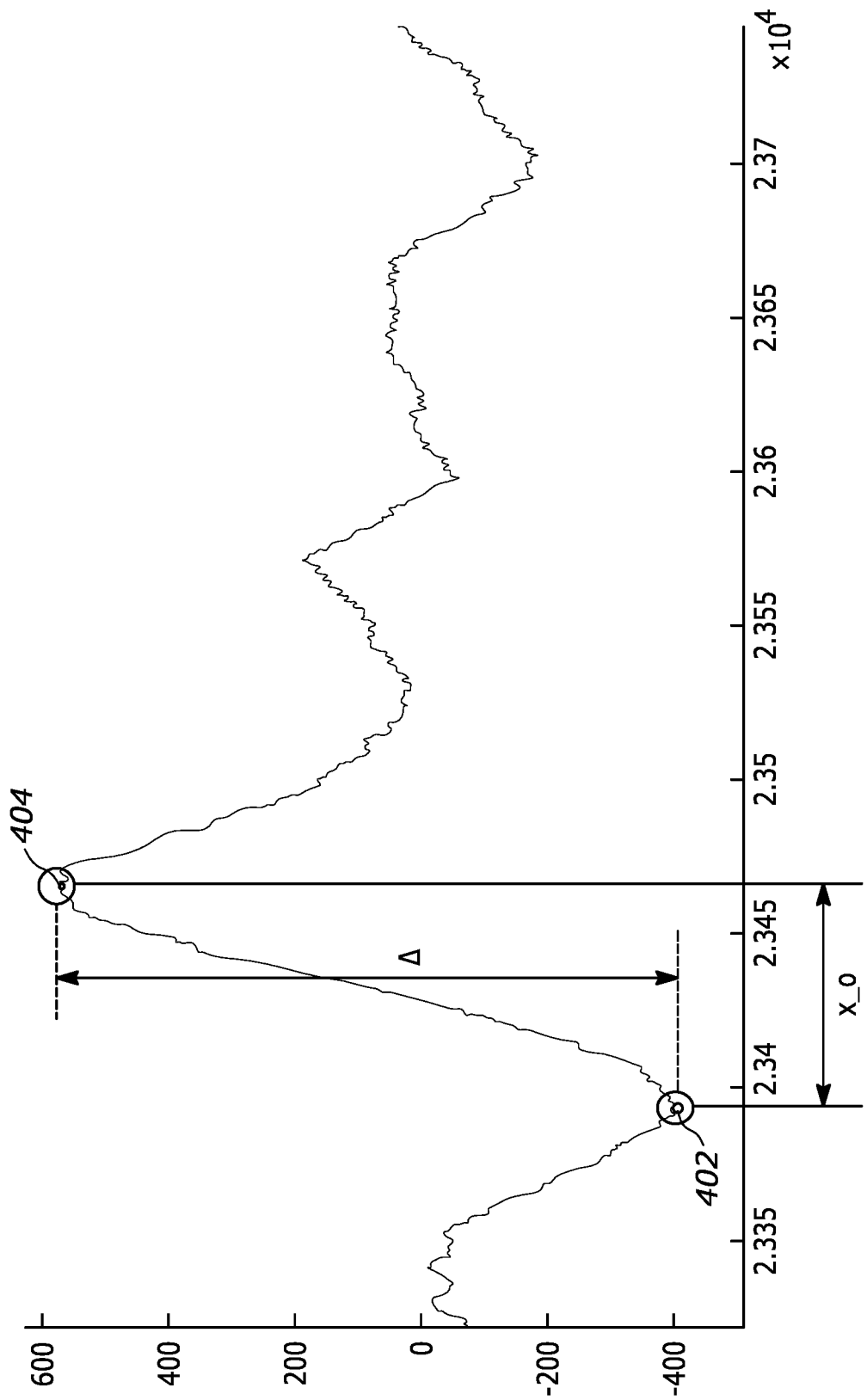
FIG. 4 is a graph illustrating detection of a slippage occurrence based on acceleration peaks in accordance with the instant disclosure.

Referring now to FIGS. 2-4, processing in accordance with the instant disclosure is illustrated. As noted above, the processing illustrated in FIGS. 2-4 may be performed by the secondary processor 130 or similar device. In particular, the processing illustrate in FIGS. 2-4 is based on the understanding that a coupling slippage, at least in the earliest stages of such occurrences, are manifested by particularly large magnitude decreases in angular velocity when the coupling first slips, and quickly followed up with a correspondingly large magnitude increase in angular velocity when the coupling once again "catches up" with the rotating member or encoder shaft to which it is attached. A further insight leveraged by the techniques described herein is that such large angular velocity decreases and increases may also be detected as rapidly occurring negative and positive acceleration peaks occurring within a certain period of time, as described below.

Starting at block 202, processing begins at block 202 wherein position data samples, such as those described above, are obtained. In a presently preferred embodiment, and as known in the art, such position data samples may be obtained and processed in a batch or "windowed" manner in which they are continuously buffered until a sufficient quantity of position data samples are obtained to perform the further analysis described below. The number of such samples to be processed in a given buffer or window will necessarily depend on the sampling rate and precision provided by the encoder, but will typically comprises several hundred to a few thousand samples. For example, in a presently preferred embodiment, a sampling period of 1 msec. (1,000 samples per second) is employed and each buffer or window of data comprises 1,024 samples or approximately 1 second of position data samples. In an embodiment, windows of 1,024 samples are successively analyzed without any overlap between such windows. However, it is appreciated that overlap between successive windows could be employed to better ensure correctly identifying slippage occurrences that may otherwise span successive, non-overlapping windows. For example, if two successive buffers of 1,024 samples are obtained, the actual analysis windows used may comprise a first window equivalent to the first buffer's 1,024 samples, a second window comprising the latter 512 samples of the first buffer and the initial 512 samples of the second buffer and, finally, a third window equivalent to the equivalent to the second buffer's 1,024 samples. Those skilled in the art that other windowing schemes (including potential varied weighting of samples) could be equally employed.

Having obtained a sufficient number of position data samples, processing continues at block 204 where angular acceleration data is determined based on position data samples. As will be appreciated by those skilled in the art, there are various methods for determining angular acceleration data based on position data samples, and the instant application is not limited in this regard.

However, in a presently preferred embodiment, this is accomplished by first determining angular velocity data based on the position data samples using know techniques. An example of this is illustrated in the top graph of FIG. 3 in which angular velocity data 300 (expressed in rotations per minute (RPM)) is plotted. Assuming a 1 msec. sampling period, the graphs in FIG. 3 all illustrate 8 seconds worth of data. As shown, the angular velocity data is fairly noisy, albeit mainly centered around about 1800 RPM in this example. As further shown in this example, there are multiple instances of significant velocity deviations 302-308 consistent with slippage occurrences. Thereafter, the angular velocity data is filtered and the middle graph of FIG. 3 illustrates an example of the resulting filtered angular velocity data 310 (again shown in terms of RPM). Preferably, the filtering performed on the angular velocity data 300 is in the nature of low-pass filtering or smoothing, i.e., higher frequencies present in the angular velocity data 300 are filtered out or suppressed using known filtering techniques. Such filtering will minimize potential false-positive detections of slippage occurrences to the extent that such occurrences are characterized by rapid changes in velocity, much like the low-level noise otherwise present in the unfiltered angular velocity data 300. Despite this filtering, it is noted that the filtered angular velocity data 310 still includes significant velocity deviations 312-318 indicative of slippage occurrences. Finally, in keeping with the well-known relationship that the derivative of a time-varying velocity signal is a time-varying acceleration signal, a derivative operation is performed on the filtered angular velocity data 310 to determine angular acceleration data 320, an example of which is shown in the bottom graph of FIG. 3 (expressed as RPM/msec.). As one would expect given that the filtered angular velocity data 310 is mainly constant in this example, the angular acceleration data 320 likewise mainly varies around the zero value with significant deviations 322-328 time-aligned with the corresponding deviations 312-318 in the filtered velocity data. Although the description above describes the filtering and derivative determination processing as separate steps, this is not a requirement. For example, in a presently preferred embodiment, a so-called Savitzky-Golay derivative filter is applied that, as known in the art is capable of simultaneously smoothing and calculating the derivative of the angular velocity data. Still other techniques that may be employed for these purposes may be apparent to those skilled in the art.

Referring once again to FIG. 2, having determined angular acceleration data, processing continues at block 206 where at least two acceleration peaks, including a negative and positive acceleration peak, are detected in the angular acceleration data. In an embodiment, this is achieved by inspecting successive (in time) data points of the angular acceleration data and identifying a local most negative angular acceleration data point followed by a local most negative angular acceleration data point, i.e., pairs of locally most negative and most positive angular acceleration data points. Examples of this are illustrated in the bottom graph of FIG. 3 in which pairs of such angular acceleration data points are highlighted with dark diamond symbols, e.g., a first pair is identified between about 0 and 750 msec., a second pair is identified centered on 1000 msec., a third pair is identified between about 1500 and 2000 msec., etc. Those skilled in the art will appreciate that various techniques for identifying such negative and positive peaks could be employed. As shown in the bottom graph of FIG. 3, the various peak pairings 322-328 corresponding to slippage occurrences may be differentiated from other peak pairings (resulting from remaining noise in the angular acceleration data 320) in terms of their respective magnitudes, i.e., the magnitudes of the peak pairings 322-328 are appreciably larger than those of the other peak pairings. Thus, in an embodiment, the determination of peak pairings 322-328 potentially corresponding to a slippage occurrence is refined by identifying such pairings only when a difference between the locally negative peak 322a-328a and its corresponding locally positive peak 322b-328b is greater than a difference threshold. An example of this is illustrated in FIG. 4 where a local most negative acceleration data point 402 and a corresponding local most positive acceleration data point 404 have a difference, $\Delta$, greater than a difference threshold, $\Delta_{th}$. By making this difference threshold sufficiently large, the lower-level peak pairings shown in the lower graph of FIG. 3 may be effectively filtered out, thereby better minimizing chances of false positive detections.

Returning once again to FIG. 2, having determined at least two acceleration peaks (one negative and one positive) in the available angular acceleration data, processing continues at block 208 where, for any given negative/positive acceleration peak pair, a determination is made if an interval between the negative acceleration peak and the corresponding positive acceleration peak is less than a first time period. For example, in the typical range of angular velocities encounter in most encoder systems (e.g., approximately 100-6,000 RPM) the first time period may be approximately 150 msec. based on an empirical understanding that, at this typical range of speeds, any given coupling slip will last no longer than 150 msec., though it is appreciated that the first time period may vary depending on the particular configuration of the encoder system. A further refinement in this regard is to recognize that the length of this first time period will generally be a function of average angular velocity based on the intuition that, the faster the angular velocity, the shorter the first time period will be in length. Thus, in a currently preferred embodiment, the first time period is based on a change percentage of the most recent average angular velocity normalized to a given period of time.

Thus, in effect, paired negative and positive acceleration peaks are deemed to be indicative of a slippage occurrence if they are of sufficient magnitude and within a relatively short period of time, i.e., if anomalously large and successive negative and positive accelerations are identified within a relative short period of time. An example of this is illustrated in FIG. 4, where an interval, t_0, between the illustrated negative acceleration peak 402 and positive acceleration peak is shown. If t_0 is less than the first time period, then a slippage occurrence is indicated, as shown at block 212 in FIG. 2. On the other hand, if a given negative/positive acceleration peaks pair is separated by an interval greater than the first time period, then no slippage occurrence is indicated and processing continues at block 210 where it is determined if additional acceleration peak data remains to be processed, which case such additional acceleration peaks are once again processed at block 208. If no addition acceleration peak data remains in this iteration, processing continues at block 202 where the process of steps 202-208 is repeated based on newly-obtained position data samples.

Although detection of any given slippage occurrence may be indicative of a malfunctioning coupling, providing an alert or error signal each time may result in an excessive number of false positives. To counter this possibility, each time a slippage occurrence is detected at block 212, processing continues at block 214 where a determination is made whether a threshold number of slippage occurrences have been detected within a second period of time. For example, in one presently preferred embodiment, if three or more slippage occurrences are found to have occurred within any 10 second window, processing continues at block 216 where a coupling error signal is generated and output, as described above. Of course, it is appreciated that the specific threshold number and/or second period of time may be selected as a matter of design choice as it will often be dependent on the configuration and expected performance of the given encoder system.

As further shown in FIG. 2, if a given instance of a slippage occurrence does not give rise to an error signal at block 216, processing will instead continue at block 210 as described above.

Based on the techniques described herein, the ability of encoder systems to identify instances of mechanical coupling slippage is facilitated based on analysis of position data obtained by rotary encoders. By detecting instances of sufficiently anomalous accelerations in such data, reliable error signals may be provided, thus further facilitating systems diagnostic or maintenance work that prevents system damage or downtime.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for detecting coupling slippage in an encoder system comprising a rotary encoder coupled to a rotating member via a mechanical coupling, the method comprising:
   obtaining position data samples from the rotary encoder;
   determining angular acceleration data based on the position data samples;
   detecting at least two acceleration peaks in the angular acceleration data, including at least one negative acceleration peak and at least one positive acceleration peak; and
   detecting a slippage occurrence of the mechanical coupling when an interval between a negative acceleration peak and a positive acceleration peak of the at least two acceleration peaks is less than a first time period.

2. The method of claim 1, wherein the first time period is 150 msec.

3. The method of claim 1, wherein the negative acceleration peak occurs before the positive acceleration peak.

4. The method of claim 1, further comprising:
   providing a mechanical coupling error signal when at least a threshold number of slippage occurrences are detected within a second time period of each other.

5. The method of claim 4, wherein the threshold number of slippage occurrences is three.

6. The method of claim 4, wherein the second time period is 10 sec.

7. The method of claim 1, wherein determining the angular acceleration data further comprises:
   determining angular velocity data based on the position data samples;
   filtering the angular velocity data to provide filtered angular velocity data; and
   determining derivatives of the filtered angular velocity data to provide the angular acceleration data.

8. The method of claim 1, wherein detecting the at least two acceleration peaks further comprises:
   identifying a local most negative angular acceleration data point in the angular acceleration data;
   identifying a local most positive angular acceleration data point occurring after the local most negative angular acceleration data point in the angular acceleration data; and
   identifying the local most negative angular acceleration data point and the local most positive angular acceleration data point as acceleration peaks when a difference between the local most negative angular acceleration data point and the local most positive angular acceleration data point is greater than a difference threshold.

9. An apparatus for detecting coupling slippage in an encoder system comprising a rotary encoder coupled to a rotating member via a mechanical coupling, the apparatus comprising:
   a processing device;
   a storage device, operatively connected to the processing device, having stored thereon executable instructions that, when executed by the processing device, cause the processing device to:
   obtain position data samples from the rotary encoder;
   determine angular acceleration data based on the position data samples;
   detect at least two acceleration peaks in the angular acceleration data, including at least one negative acceleration peak and at least one positive acceleration peak; and
   detect a slippage occurrence of the mechanical coupling when an interval between a negative acceleration peak and a positive acceleration peak of the at least two acceleration peaks is less than a first time period.

10. The apparatus of claim 9, wherein the first time period is 150 msec.

11. The apparatus of claim 9, wherein the negative acceleration peak occurs before the positive acceleration peak.

12. The apparatus of claim 9, the storage device further comprising executable instructions that, when executed by the processing device, cause the processing device to:
   provide a mechanical coupling error signal when at least a threshold number of slippage occurrences are detected within a second time period of each other.

13. The apparatus of claim 12, wherein the threshold number of slippage occurrences is three.

14. The apparatus of claim 12, wherein the second time period is 10 sec.

15. The apparatus of claim 9, wherein those executable instructions that, when executed by the processing device, cause the processing device to determine the angular acceleration data are further operative to:
   determine angular velocity data based on the position data samples;
   filter the angular velocity data to provide filtered angular velocity data; and
   determine derivatives of the filtered angular velocity data to provide the angular acceleration data.

16. The apparatus of claim 9, wherein those executable instructions that, when executed by the processing device, cause the processing device to detect the at least two acceleration peaks are further operative to:
   identify a local most negative angular acceleration data point in the angular acceleration data;
   identify a local most positive angular acceleration data point occurring after the local most negative angular acceleration data point in the angular acceleration data; and identify the local most negative angular acceleration data point and the local most positive angular acceleration data point as acceleration peaks when a difference between the local most negative angular acceleration data point and the local most positive angular acceleration data point is greater than a difference threshold.

17. The apparatus of claim 9, wherein the processing device and the storage device are disposed within the rotary encoder.

* * * * *